(12) United States Patent
Johnson et al.

(10) Patent No.: US 6,637,024 B1
(45) Date of Patent: Oct. 21, 2003

(54) METHOD AND PRODUCT FOR DEBUGGING A TARGET JAVA VIRTUAL MACHINE HAVING NO DEBUG INFORMATION THEREIN

(75) Inventors: Graeme D. Johnson, Ottawa (CA); Marcio Q. Marchini, Nepean (CA)

(73) Assignee: International Business Machines Corporation, NY (US)

( * ) Notice: Subject to any disclaimer, the term of this patent is extended or adjusted under 35 U.S.C. 154(b) by 0 days.

(21) Appl. No.: 09/563,685

(22) Filed: May 3, 2000

(51) Int. Cl.$^7$ ................................................. G06F 9/44
(52) U.S. Cl. ...................................... 717/124; 709/203
(58) Field of Search .................. 717/124–135; 709/203

(56) References Cited

U.S. PATENT DOCUMENTS

| | | | | |
|---|---|---|---|---|
| 5,560,009 A | * | 9/1996 | Lenkov et al. ............... | 717/124 |
| 5,787,245 A | * | 7/1998 | You et al. ..................... | 714/38 |
| 5,838,975 A | * | 11/1998 | Abramson et al. .......... | 717/129 |
| 5,901,315 A | * | 5/1999 | Edwards et al. ............ | 717/124 |

* cited by examiner

Primary Examiner—Gregory Morse
Assistant Examiner—Kenneth Gross
(74) Attorney, Agent, or Firm—Gregory M. Doudnikoff

(57) ABSTRACT

A method find computer program product for debugging a virtual machine, preferably a target lava virtual machine, without need for the virtual machine to comprise debug information required by a debugger, the method being applied during communication of request packets between the debugger and the virtual machine during execution of the debugger, the method comprising the steps of receiving the request packets from the debugger prior to communication of the request packets to the virtual machine, processing the request packets whereby the required debug information is provided to predetermined packets thereof, transmitting the processed request packets for communication to the virtual machine, receiving reply packets from the virtual machine, processing the reply packets for reply to the debugger, and transmitting the processed reply packets to the debugger. The method and computer program product may also be provided wherein the debug information comprises line tables and the step of processing request packets comprises translating line-based request packets to instruction-based request packets. The method and computer program product may also be provided wherein the formal of the request packets is defined by the Java Debug Wire Protocol (JDWP) or the predetermined request packets may be those packets determined to require debug information in the proxy.

23 Claims, 2 Drawing Sheets

METHOD AND PRODUCT FOR DEBUGGING A TARGET JAVA VIRTUAL MACHINE HAVING NO DEBUG INFORMATION THEREIN

FIELD OF THE INVENTION

The invention pertains generally to debugging tools to support software applications for Java™ platforms and, more particularly, to a debugging method and computer program product for debugging a target Java virtual machine (VM) which does not include the usual debug symbol information required by the debug interface/debugging protocol of a Java virtual machine (such as the standard Java Debugging Wire Protocol (JDWP)).

BACKGROUND OF THE INVENTION

Software application development programs are typically equipped with debuggers (being a type of software tool) whose purpose it is to track for the user the execution steps taken when a target application program is run such that the debugger identifies the application program source or assembly code statements that have been executed during the debugging session, the values that have been assigned to variables at each step, etc. With the information generated by the debugger the user can more readily determine whether or not the application program ran as it was supposed to and, if not, identify the point in the application program which failed to properly execute as well as other execution tracking information such as the values of local variables, etc. For these reasons debugging tools are equally important for developing, testing and maintaining Java virtual machines and Java platforms comprising them as the application programs to be run on those platforms.

The remote (debugging of a Java virtual machine (VM) is typically done using the Java Debug Interface (JDI) application program interface (API) developed by Sun Microsystems, Inc. The JDI is a high-level Java programming language interface which includes support for remote debugging. The target virtual machine to be remotely debugged will also normally support the Java Virtual Machine Debug Interface (JVMDI) API which is a low-level native interface and defines the services a Java virtual machine must provide for debugging. Further, the underlying communications between a debugger and the virtual machine are typically done using the standard debug protocol developed for Java applications, known as the Java Debug Wire Protocol (JDWP), in which case the virtual machine only needs to know the JDWP which defines the format of information and requests transferred during the debugging process between the virtual machine and the debugger front-end.

According to the standard debug protocol (JDWP) it is assumed that the target virtual machine will have complete information about class names, field names, line number information for each method, local variables, etc. (this information usually being present in class files compiled to have debug information), and this assumption implies that the target virtual machine must comprise class files having as much debug information as possible. It also requires that the virtual machine be packaged without the removal of fully qualified names even if they are not needed (such as when, for instance, reflection is not used by the program).

The JDI, as specified by Sun Microsystems, supports both line and instruction-based stepping but the former, which is typically preferred by application developers, requires that a much greater amount of debug information, including line number tables, be made available. Line-based debug requests require the use of these line number tables to translate line-based requests into the corresponding instruction-based requests which are actually required by the virtual machine for execution. To provide for this translation the Java compiler provides a set of line number tables in the usual compiler-generated debug information and these tables generally make up a large percentage of the total size of the debug information. The information provided by these tables is used by the virtual machine to translate any line-based request received from the debugger to an instruction-based request. For example, two lines of a source code program which a debugger might step over could be: Line 1: a=1+2 and Line 2: a=a+1, whereas the virtual machine will actually execute the following four instruction-level step operations for each line instruction:

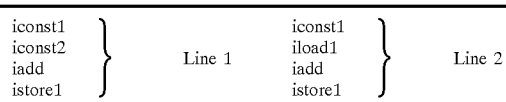

C compilers which compile application programs produce both a "fat debug" image having all the required debug information and a "normal", non-debug counterpart so that after the desired debugging has been completed the non-debug program, usually being smaller than the debug version, can instead be installed for use. However, this method is not suitable for embedded Java programs, representing a likely environment for Java virtual machines, because the target program would then have to contain all the necessary debug information in class files and this debug information may require substantial space (memory) which may not be available in the embedded environment. Well-designed embedded products are intentionally "right-sized" to consume all target platform resources and, thus, the inclusion of additional debug information in such a virtual machine will typically not work in a production system (i.e. either because there is no extra memory on which such extra information may reside or because the use of extra memory would impair program execution).

The present invention addresses and resolves the foregoing problem posed by the limited memory resources in the production environments of embedded virtual machines for which it may not be possible to include debug information in the virtual machine bytecodes.

SUMMARY OF THE INVENTION

In accordance with the present invention there is provided a method for debugging a virtual machine without need for the virtual machine to comprise debug information required by a debugger, the method being applied during communication of request packets between the debugger and the virtual machine during execution of the debugger, the method comprising the steps of receiving the request packets from the debugger prior to communication of the request packets to the virtual machine, processing the request packets whereby the required debug information is provided to predetermined packets thereof, transmitting the processed request packets for communication to the virtual machine, receiving reply packets from the virtual machine, processing the reply packets for reply to the debugger, and transmitting the processed reply packets to the debugger. The method may be further provided wherein the virtual machine is a target Java virtual machine. Also, the method may be further comprise the step of providing a proxy comprising the debug information separate from the virtual machine and for performing the processing, receiving and transmitting steps. Further, the preceding method may comprise as a preliminary step, the step of transferring the debug information from the virtual machine into the proxy. Or, the preceding method may further comprise as a preliminary step, the step of packaging an image of the virtual machine comprising the debug information and incorporating the image into the proxy. The method may also be provided wherein the debug information comprises line tables and the step of processing request packets comprises translating line-based request packets to instruction-based request packets. The method may also be provided wherein the format of the request packets is defined by the Java Debug Wire Protocol (JDWP). And the predetermined request packets may be those packets determined to require debug information in the proxy.

There is also provided a computer program product for use in debugging a virtual machine without need for the virtual machine to comprise debug information required by a debugger, the computer program product comprising the debug information, means for receiving request packets from the debugger prior to communication of the request packets to the virtual machine, means for processing the request packets whereby required debug information is provided to predetermined packets thereof, means for transmitting the processed request packets for communication to the virtual machine, means for receiving reply packets from the virtual machine, means for processing the reply packets for reply to the debugger, and means for transmitting the processed reply packets to the debugger. The computer program product may also be provided wherein the virtual machine is a target Java virtual machine. Further, the computer program product may be provided wherein the debug information comprises line tables and the means for processing request packets comprises means for translating line-based request packets to instruction-based request packets. The computer program product may also be provided wherein the format of the request packets is defined by the Java Debug Wire Protocol (JDWP). And, the predetermined request packets may be those packets determined to require debug information. The computer program product according to claim 9 wherein the debug information is defined by a symbol file.

Further, there is provided an article of manufacture comprising a computer usable medium having computer readable, program code means therein for debugging a virtual machine without need for the virtual machine to comprise debug information required by a debugger, the computer readable program code means in said article of manufacture comprising the debug information, computer readable code means for causing a computer to effect receiving request packets from the debugger prior to communication of the request packets to the virtual machine, computer readable code means for causing a computer to effect processing the request packets whereby the required debug information is provided to predetermined packets thereof, computer readable code means for causing a computer to effect transmitting the processed request packets for communication to the virtual machine, computer readable code means for causing a computer to effect receiving reply packets from the virtual machine, computer readable code means for causing a computer to effect processing the reply packets for reply to the debugger, and computer readable code means for causing a computer to effect transmitting the processed reply packets to the debugger. The article of manufacture may be further provided wherein the virtual machine is a target Java virtual machine. Additionally, the article of manufacture may be provided wherein the debug information is transferred from the virtual machine. Also, the article of manufacture may be provided wherein the debug information is an image of the virtual machine. Further, the article of manufacture may be provided wherein the debug information comprises line tables and the step of processing request packets comprises translating line-based request packets to instruction-based request packets. Also, the article of manufacture may be provided wherein the format of the request packets is defined by the Java Debug Wire Protocol (JDWP). And, the predetermined request packets may be those packets determined to require debug information.

In addition, there is provided a computer program product for use in debugging a Java virtual machine without need for the Java virtual machine to comprise debug information required by a debugger, the computer program product comprising the debug information, means for receiving request packets from the debugger prior to communication of the request packets to the Java virtual machine, means for processing the request packets whereby required debug information is provided to predetermined packets thereof, means for determining whether the request packets are required to be transmitted to the Java virtual machine and if not so required, transmitting reply packets to the debugger, means for transmitting, if so required, the processed request packets for communication to the Java virtual machine, means for receiving reply packets from the Java virtual machine, means for processing the reply packets for reply to the debugger, and means for transmitting the processed reply packets to the debugger.

Also provided is a computer program product for use in debugging a Java virtual machine without need for the Java virtual machine to comprise debug information required by a debugger, the computer program product comprising the debug information, means for receiving request packets from the debugger prior to communication of the request packets to the Java virtual machine, means for processing the request packets whereby required debug information is provided to predetermined packets thereof, means for transmitting the processed request packets for communication to the Java virtual machine, means for receiving reply packets from the Java virtual machine, means for determining whether additional information is needed by the Java virtual machine and if so needed, transmitting one or more request packets to the Java virtual machine and receiving one or more reply packets from the Java virtual machine until the additional information is obtained, means for processing the reply packets for reply to the debugger, and means for transmitting the processed reply packets to the debugger.

DESCRIPTION OF THE DRAWINGS

The preferred embodiment of the present invention is described in detail below with reference to the following drawings in which like reference numerals refer throughout to like elements.

DETAILED DESCRIPTION OF A PREFERRED EMBODIMENT

Figure 1:
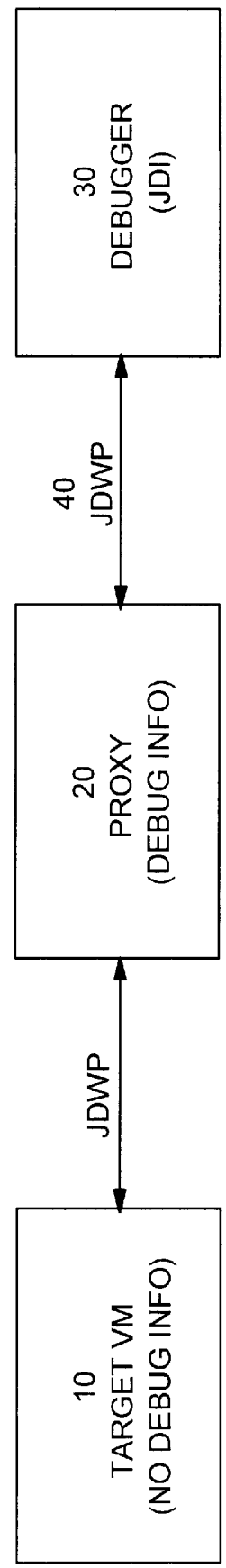
FIG. 1 is a block diagram showing the use of a proxy interface program comprising debug information in accordance with the invention to transparently permit a debugger to run on a virtual machine having no debug information; and, FIG. 2 is a flow chart diagram showing the steps taken by the exemplary proxy interface program described hereinafter.

As illustrated by FIG. 1 the preferred embodiment of the present invention provides a method and computer product, in the form of a proxy interface program 20 which, from the perspective of the debugger 30, acts as a transparent interface between the debugger 30 and a Java virtual machine 10 which itself does not comprise the debug information required by the debugger 30. The function of the proxy 20 is to permit the debugger 30 to run on the target Java virtual machine 10 even though the virtual machine does not itself have the debug information required by the debugger—instead, the debug information is held by the proxy 20 (implemented in the form of an object-oriented program), which is separate from the target Java virtual machine 10 and need not be resident (or embedded) with the target Java virtual machine.

The proxy 20 (also referred to herein as the "target proxy" because the debugger sees the proxy 20 and the virtual machine 10 together as a single target, namely, as the target virtual machine) dynamically processes the request code packets 40 targeted to the virtual machine 10 which are received using the debug protocol and adapts those received packets 40, which require debug information being held by the proxy 20, by providing to them the required information. The processed packets are then forwarded by the proxy 20 to the virtual machine 10 to execute the debug code. Once that code has been executed the debug output code packets are passed using the debug protocol from the virtual machine 10 to the proxy 20 for dynamic processing to furnish those output code packets with any required debug information held by the proxy 20 (if and when there is such a need in respect of any of the output packets). The proxy 20 thereby eliminates any need for such debug information, including the aforementioned large line tables, to be provided by the target virtual machine 10 and it operates transparently from the perspective of the debugger 30.

Accordingly, the present invention provides for a thin virtual machine to be packaged and installed (i.e. in an embedded environment, for example) while, at the same time, an image thereof, comprising debug information for that virtual machine, is separately packaged for incorporation into the proxy 20. The present invention alternatively provides for dynamically removing the application debug information from the virtual machine as it is installed and transferring this information to the proxy. To do so, as the application classes are installed (whether, for example, through loading the application from diskette or by downloading it via the Internet) the executable and debug portions are split and the debug information is transferred to the proxy using an extended JDWP packet (this extension mechanism is known in the art and is specified by Sun Microsystems). In both of these situations the virtual machine 10 is without debug information and, instead, the debug information is provided in the proxy 20.

Not all of the request code packets 40 exchanged between the debugger 30 and the target proxy will require processing to supply debug information. Those that require such processing are predetermined and depend upon the communication protocol being used between the debug program application interface (API) and the target virtual machine 10. For those code packets 40 which do not require such processing the proxy 20 simply passes them on to the virtual machine 10 as received from the debugger 30. Therefore, to appropriately define a format for the proxy 20 it is necessary to know the communication protocol being used and to identify those protocol packets which can simply be forwarded on to the virtual machine as received and those which need special processing. In addition, it is necessary to determine the type of processing needed by those packets which require processing so that the proxy can be appropriately programmed to carry out all required processing steps. This information determines the required debug information (i.e. from which appropriate debug file formats may be decided upon) and the exact action required to be taken by the proxy 20.

Figure 2:
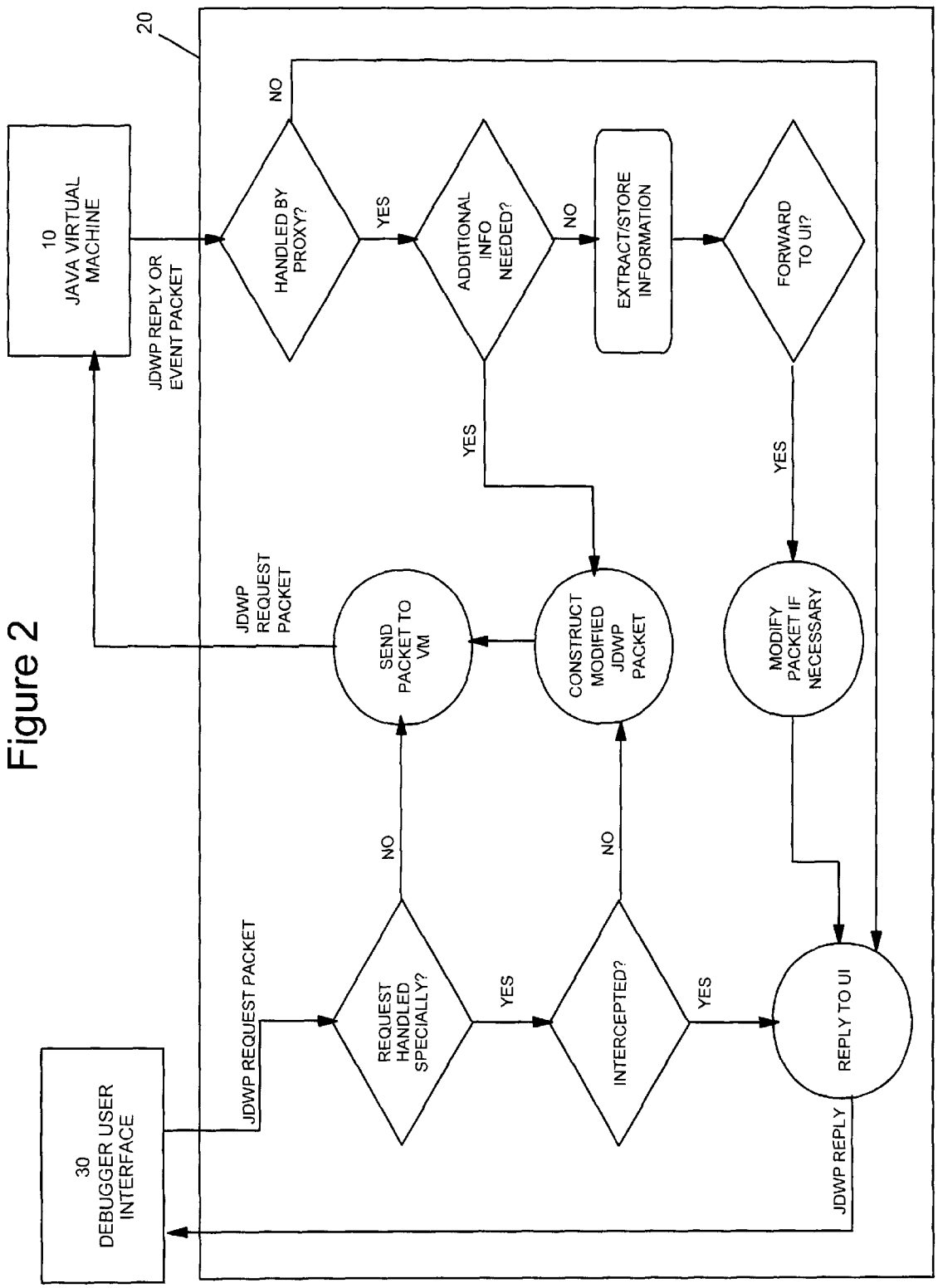

The processes implemented by the exemplary proxy 20 are illustrated by the flow chart diagram of FIG. 2 which shows the flow of JDWP request and reply code packets, through the proxy 20, from the debugger UI 30 (i.e. JDI) to the virtual machine 10 and from the virtual machine 10 to the debugger UI 30, respectively. As shown, when a request packet is received by the proxy 20, from the debugger 30, which does not require modification to include debug information it is sent directly to the virtual machine 10 (i.e. the answer to the test "Request Handled Specially?" is no). When the request does require modification to include debug information and must be processed by the virtual machine in order to obtain the required reply, the request packet is modified as described herein and sent to the virtual machine 10. If, however, the request can be answered by the proxy without need of the virtual machine the request is intercepted by the proxy and the proxy itself replies to the debugger 30.

Also as shown in FIG. 2, a reply (or event) packet received by the proxy 20 from the virtual machine 10 is first assessed to determine whether it corresponds to a request packet which was modified or otherwise processed by the proxy and, if it doesn't, it is sent directly for reply to the debugger 30. If it does so correspond it is further assessed to determine whether additional information is needed by the virtual machine in order to process the request and, if so, the packet is further modified or processed by the proxy and returned to the virtual machine 10. This sequence occurs whenever the proxy needs more information from the virtual machine to satisfy a request as is frequently the case during emulation of line-based stepping. The proxy has the line table debug information needed to translate a line-based request for execution by the virtual machine and on using this information (as described herein) it may take a number of instruction step operations by the virtual machine before the required reply information is obtained by the proxy for sending to the debugger 30. In FIG. 2 the reply and request packet transfer from and to the virtual machine, respectively, is intended to encompass this situation in which additional information is required by the virtual machine and the proxy constructs a new packet (the packet type depending on what information is needed) and dispatches the request to the virtual machine (i.e. such that this packet going to the virtual machine is generated by the proxy rather than being received from the debugger). Then the reply received from the virtual machine is determined to have been handled by the proxy and is again tested to determine if additional information is needed, until eventually no more information is needed (e.g. such as when, in the instance of a line-based request emulation, all of the instruction step operations have been passed to and executed by the virtual machine). If the packet is determined to have been handled by the proxy but is not in need of additional information it is forwarded for reply to the debugger and information in the packet may be extracted and stored within the proxy itself. This situation is provided for because not all information received from the virtual machine is necessarily forwarded to the debugger. For example, the proxy tracks class load events and extracts/stores symbol files transmitted by the virtual machine without passing that information to the debugger.

For the JDWP protocol, the code packets 40 thereof which are listed below, by command set and command number, in Table A require modification (special processing) by the proxy 20 as detailed in the right-hand column of this table. Those packets 40 which are not identified in Table A do not require special processing and are passed on to the virtual machine 10 by the proxy 20 in the form received.

TABLE A

| Command Set | Command Number | Special Processing Performed by Target Proxy Component* |
|---|---|---|
| Set 1 — VM Commands | Command 2 — Get classes for signature | This packet needs special processing because classes on the target may have been renamed. The proxy will need a table mapping target modified names (signatures) to original names (signatures). If nothing has been renamed (i.e. if the table is empty) then the packet is forwarded as received. |
| Set 1 — VM Commands | Command 3 — Get all classes | This packet needs special processing because classes on the target may have been renamed. The proxy will need a table mapping target modified names (signatures) to original names (signatures). If nothing has been renamed (i.e. if the table is empty) then the packet is forwarded as received. |
| Set 1 — VM Commands | Command 7 — Get ID sizes | This packet needs to be intercepted so that the proxy can "learn" the ID sizes for the target VM so that all subsequent packets can be read properly. |
| Set 2 — Type Commands | Command 1 — Get Signature | This packet needs special processing because classes on the target may have been renamed. The proxy will need a table mapping target modified names (signatures) to original names (signatures). If nothing has been renamed (i.e. if the table is empty) then the packet is forwarded as received. |
| Set 2 — Type Commands | Command 4 — Get Fields | This packet needs special processing because field names and/or field signatures on the target may have been renamed. The proxy will need a table mapping target modified field names and signatures to original field names and signatures. This has to be provided on a per-type basis. If nothing has been renamed (i.e. if the table is empty) then the packet is forwarded as received. |
| Set 2 — Type Commands | Command 5 — Get Methods | This packet needs special processing because method names and/or method signatures on the target may have been renamed. The proxy will need a table mapping target modified method names and signatures to original method names and signatures. This has to be provided on a per-type basis. If nothing has been renamed (i.e. if the table is empty) then the packet is forwarded as received. |
| Set 2 — Type Commands | Command 7 — Get Source File | This packet needs special processing because the file name for a class may not be on the target (this is usually in the .class file). |
| Set 2 — Type Commands | Command 8 — Get Nested Types | This packet needs special processing if the target virtual machine does not maintain any inner type information. Only the proxy knows that, based on symbol file information. |
| Set 3 — Class TypeCommands | Command 5 — Invoke Method | These packets contain embedded method name and signature information which must be translated from the original method names/signatures to the names and signatures actually used by the target virtual machine. |
| Set 3 — Class TypeCommands | Command 6 — New Instance | These packets contain embedded method name and signature information which must be translated from the original method names/signatures to the names and signatures actually used by the target virtual machine. |
| Set 6 — Method Commands | Command 1 — Get Line Table | This packet needs special processing because line number information is likely not to be present on the target. This information is usually in .class files and must be provided on a per-method basis. |
| Set 6 — Method Commands | Command 2 — Get Variable Table | This packet needs special processing because line number information is likely not to be present on the target. This information is usually in .class files and must be provided on a per-method basis. |

TABLE A-continued

| Command Set | Command Number | Special Processing Performed by Target Proxy Component* |
|---|---|---|
| Set 136 — Class Loader Commands | Command 2 — Get Class for Name | This packet needs special processing because classes on the target may have been renamed. The proxy will need a table mapping target modified names (signatures) to original names (signatures). If nothing has been renamed (i.e. if the table is empty) then the packet is forwarded as received. |
| Set 136 — Class Loader Commands | Command 3 — Reload Classes | This packet needs special processing because classes on the target may have been renamed. The proxy will need a table mapping target modified names (signatures) to original names (signatures). If nothing has been renamed (i.e. if the table is empty) then the packet is forwarded as received. |
| Set 136 — Class Loader Commands | Command 4 — Load Class | This packet needs special processing because classes on the target may have been renamed. The proxy will need a table mapping target modified names (signatures) to original names (signatures). If nothing has been renamed (i.e. if the table is empty) then the packet is forwarded as received. |
| Set 64 — From Back-End to Front-End | Command 10 — Class Unload Event | This packet needs special processing because classes on the target may have been renamed. The proxy will need a table mapping target modified names (signatures) to original names (signatures). If nothing has been renamed (i.e. if the table is empty) then the packet is forwarded as received. |

Some packets use "location" and location items are currently treated as opaque values by Sun Microsystem's JDWP packet descriptions. If, however, the JDWP format were to change to indicate these as being program counter (pc) values then it may be necessary to process additional packets. However, a determination of such additional packets and of the packet modification to be effected by the proxy, are well within the knowledge and understanding of persons skilled in the art.

As identified by Table A, it is necessary for the proxy 20 to provide debug information on each of: (i) a per-method basis; (ii) a per-type basis; and (iii) a per-package basis. Since each virtual machine image package must include a set of classes, and the classes include sets of methods, a single symbol file describing the entire package (VM image) was selected for use and the format of this proxy debug information (symbol) file is set out below. It is to be understood, however, that the chosen proxy implementation may also support multiple symbol files.

In the preferred embodiment the classes are loaded dynamically from the image. However, if classes are installed remotely (for example, using the debugger) then information about them will not be in the symbol file. This may require the proxy to watch for packets that install classes and then perform processing according to: (i) if the class did not exist in the image, add information about this class to the proxy mapping table and, (ii) if this is a new version of an existing class, override the information obtained from the symbol file.

A big endian format (i.e. according to which the number 0x01020304 is stored as a sequence of bytes 01 02 03 04) is assumed for the proxy debug information format (this being the format of JDWP) of the preferred embodiment.

The data types used are:

| | |
|---|---|
| u1 | unsigned byte |
| u4 | unsigned 4-byte integer, big endian format |
| utf8 | as in .class files, a UTF-8 encoded string, not zero terminated, proceeded by a two-byte integer length |
| Putf8 | a u4 value that represents an "offset pointer" to a utf8 "object". If 0, it means "nil" (where permitted). This allows the representation to be used in-place (file) or in memory. To get to the real data the position/address of the beginning of the "file" (where you started reading the header) is added to this value. Thus, it is just an offset in bytes from the beginning. |

Although the JDWP protocol uses a four-byte integer length, a two-byte integer length was chosen to match the format of class files (two-byte length) because this format can be read/written in Java more easily (using java.io.DataInputStream/java.io.DataOutputStream). This format is also more easily generated from the virtual machine since it is compatible with class files (which the virtual machine knows how to load) and does not waste space since names for classes, methods, fields, etc will not be bigger than 64K.

The following structure has been adopted for the symbol file for a given packaged Java image incorporated into the proxy 20 of the preferred embodiment of the invention.

```
<FILE> = <HEADER> <CLASSES> <UTF-DATA>
<HEADER>=
u4         format                (= 0xDECAFE)      // tag to indicate this is a symbol file
u1         versionMajor          (=0x0 for now)    // file format version (major)
u1         versionMinor          (=0x1 for now)    // file format version (minor)
u1         reserved1             (=0x0 for now)    // padding (open for future use)
u1         reserved2             (=0x0 for now)    // padding (open for future use)
u4         numberOfClasses                         // how many class entries in the debug file
u4         fileSizeInBytes                         // total length, including the header, which is
                                                   // useful when transmitting the file over the wire and
                                                   // also when reading the UTF-DATA (when to stop)
u4         reserved 3            (=0x0 for now)    // reserved for future use
<CLASSES> = CLASS-INFO [NumberOfClasses]
<CLASS-INFO> =
Putf8      originalName                            // original class name (as in the .class file)
Putf8      newName                                 // new name given by the packager*
Putf8      sourceFileName                          // .java file where this class came from (as in the
                                                   // .class file)
u4         numberOfFields                          // how many fields this class has/defines
u4         numberOfMethods                         // how many methods this class has/defines
u4         numberOfInnerTypes                      // how many inner classes this type has/defines
FIELD-INFO[numberOfFields]                         // field descriptors themselves
METHOD-INFO [ numberOfMethods]                     // methods descriptors themselves
INNER-TYPE-INFO[numberOfInnerTypes]                // inner class descriptors themselves
<INNER-TYPE-INFO> **=
Putf8      originalName                            // original field name (as in the .class file).
                                                   // e.g. tst.Foo$Bar
Putf8      sourceName                              // name as in the source (.java) file. e.g. Bar
<FIELD-INFO> =
Putf8      originalName                            // original field name (as in the .class file)
Putf8      newName                                 // new name given by the packager
Putf8      original Signature                      // original field signature (as in the .class file)
Putf8      newSignature                            // new signature given by the packager
<METHOD-INFO>=
Putf8      originalName                            // original method name (as in the .class file)
Putf8      newName                                 // new name given by the packager
Putf8      originalSignature                       // original method signature (as in the .class file)
Putf8      newSignature                            // new signature given by the packager.
u4         numberOfLineNumInfo                     // how many line number descriptors for this method
u4         numberOfVarInfo                         // how many variable descriptors for this method
LINE-NUMBER-INFO [numberOfLineNumInfo]             // descriptors themselves
VAR-INFO [numberOfVarInfo]                         // descriptors themselves
LINE-NUMBER-INFO =
u4         location                                // VM-defined location. Could be bytecode offset,
                                                   // address, etc
u4         lineNumber                              // which line number in the source file for this class
VAR-INFO =
Putf8      name                                    // variable name (as in the .class file)
Putf8      signature                               // variable signature (as in the .class file)
u4         slotNumber                              // temp<n> — indicates where in the list of temps it is
u4         locationStartVisibility                 // VM-defined location where the variable starts being
                                                   // visible
u4         visibilityLength                        // VM-defined location offset for a location,
                                                   // defining a "visibility region"
UTF-DATA> =
utf8       data1                                   // all utf8 data comes at the end of the "file"
utf8       data2
```

*If no renaming was performed, it should point to the same UTF8 as the originalName. A value of "nil" (0) is not legal and this rule is valid throughout.

**ClassInfo is not defined to have ClassInfo inside (for inner types) for the preferred embodiment because: (i) a flat structure is desired; and (ii) it is desired to permit the container class to be in a symbol-file different from the inner class itself. An example of the use of this is where the type is loaded dynamically in which case its inner classes aren't necessarily loaded as well such that it is not possible to "point to" them. Instead, an "indirect pointer" is provided, namely, its name as in the class file.

The foregoing format keeps all variable-size data types at the end which provides convenience when reading. This choice does, however, make the file harder to generate without skipping back to update values, etc.

The foregoing symbol file format for the proxy 20 includes, under the designation "LINE-NUMBER-INFO=", the line tables which are used by the proxy to translate a line-based request (received from the debugger) into an instruction-based request for the virtual machine. With this information the proxy is able to emulate line stepping behaviour whereby an incoming line-based step request starts a simple finite state machine sequence that repeatedly requests information from the virtual machine to determine the current location, checks the reply against the appropriate line table, and then issues an instruction step request to the virtual machine if necessary. When the requested line has been reached the proxy sends a reply to the debugger in response to the line-step request. As a result of this dynamic translation by the proxy the debugger is able to achieve the desired line-by-line stepping without need for the associated, lengthy line tables within the virtual machine. Moreover, the advantageous effect of the proxy doing this translation is equivalent to the debugger UI being written in terms of instruction-based stepping.

It is to be understood that the specific format used for the proxy debug image, and the specific debug protocol and packets thereof that are utilized, according to the foregoing description pertaining to a preferred embodiment, are examples only of one implementation of the invention and are not intended to limit the scope of the invention to which, from the teachings provided herein, could be implemented in alternative computer program embodiments by persons skilled in the art.

The detailed descriptions may have been presented in terms of program procedures executed on a computer or network of computers. These procedural descriptions and representations are the means used by those skilled in the art to most effectively convey the substance of their work to others skilled in the art. They may be implemented in hardware or software, or a combination of the two.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

In the case of diagrams depicted herein, they are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the preferred embodiment of this invention has been described in relation to the Sun Microsystems, Inc.'s Java language, this invention need not be solely implemented using the Java language. It will be apparent to those skilled in the art that the invention may equally be implemented in other computer languages, such as an object oriented language like Smalltalk.

The invention is preferably implemented in a high level procedural or object-oriented programming language to communicate with a computer. However, the invention can be implemented in assembly or machine language, if desired. In any case, the language may be a compiled or interpreted language.

While aspects of the invention relate to certain computer language and other technological specifications (e.g. the Java Debugging Wire Protocol, the Java Debug Interface and the Java Virtual Machine Debug Interface), it should be apparent that classes, objects, components and other such software and technological items referenced herein need not fully conform to the specification(s) defined therefor but rather may meet only some of the specification requirements. Moreover, the classes, objects, components and other such software and technological items referenced herein may be defined according to equivalent specification(s) other than as indicated herein that provides equivalent or similar functionality, constraints, etc.

The invention may be implemented as an article of manufacture comprising a computer usable medium having computer readable program code means therein for executing the method steps of the invention or a computer program product. Such an article of manufacture or computer program product may include, but is not limited to, CD-ROMs, diskettes, tapes, hard drives, computer RAM or ROM and/or the electronic, magnetic, optical, biological or other similar embodiment of the program. Indeed, the article of manufacture, program storage device or computer program product may include any solid or fluid transmission medium, magnetic or optical, or the like, for storing or transmitting signals readable by a machine for controlling the operation of a general or special purpose programmable computer according to the method of the invention and/or to structure its components in accordance with a system of the invention.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such a cellular telephone). The to system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computer system or other apparatus. The required structure for a variety of these systems will appear from the description given.

While this invention has been described in relation to preferred embodiments, it will be understood by those skilled in the art that changes in the details of construction, arrangement of parts, compositions, processes, structures and materials selection may be made without departing from the spirit and scope of this invention. Many modifications and variations are possible in light of the above teaching. Thus, it should be understood that the above described embodiments have been provided by way of example rather than as a limitation and that the specification and drawing(s) are, accordingly, to be regarded in an illustrative rather than a restrictive sense.

The embodiments of the invention in which an exclusive property or privilege is claimed are defined as follows:

1. A method for debugging a virtual machine, the method being applied during communication of request packets between a debugger and the virtual machine during execution of the debugger, the method comprising the steps of:
   receiving request packets sent by a debugger prior to receipt of the request packets by the virtual machine;
   processing the request packets so that required debug information is provided to predetermined packets of the request packets;
   transmitting the processed predetermined request packets to the debugger;
   transmitting non-predetermined request packets to the virtual machine;
   receiving reply packets from de virtual machine;
   processing the received reply packets for reply to the debugger, and
   transmitting the processed reply packets to the debugger.

2. The method according to claim 1 wherein the virtual machine is a target Java virtual machine.

3. The method according to claim 1 further comprising the step of providing a proxy which includes the debug information separate from the virtual machine, wherein the proxy performs said processing, receiving and transmitting steps.

4. The method according to claim 3 further comprising, prior to said step of receiving request packets, the step of transferring the debug information from the virtual machine into the proxy.

5. The method according to claim 3 further comprising, prior to said step of receiving request packets, the step of packaging an image of the virtual machine comprising the debug information and incorporating the image into the proxy.

6. The method according to claim 1 wherein the debug information comprises line tables and wherein the step of processing request packets further comprises translating line-based request packets to instruction-based request packets.

7. The method according to claim 1 wherein the format of the request packets is defined by the Java Debug Wire Protocol (JDWP).

8. The method according to claim 3 wherein the predetermined packets are those request packets determined to require the debug information in the proxy.

9. A computer program product for use in debugging a virtual machine, the computer program product comprising:
   a proxy for storing debug information;
   means for receiving request packets sent by a debugger prior to receipt of the request packets by the virtual machine;
   means for processing the request packets so that required debug information is provided to predetermined packets of the request packets by said proxy;
   means for transmitting the processed predetermined request packets as reply packets to the debugger,
   means for transmitting non-predetermined packets as request packets to the virtual machine;
   means for receiving reply packets from the virtual machine;
   means for processing the received reply packets for reply to the debugger; and
   means for transmitting the processed received reply packets to the debugger.

10. The computer program product according to claim 9 wherein the virtual machine is a target Java virtual machine.

11. The computer program according to claim 9 wherein the debug information comprises line tables and wherein said means for processing request packets comprises means for translating line-based request packets to instruction-based request packets.

12. The computer program product according to claim 9 wherein the format of the request packets is defined by the Java Debug Wire Protocol (JDWP).

13. The computer program product according to claim 9 wherein the predetermined packets are those packets determined to require the debug information.

14. The computer program product according to claim 9 wherein the debug information is defined by a symbol file.

15. An article of manufacture comprising a computer usable medium having computer readable program code means therein for use in debugging a virtual machine, in which debug information required by a debugger and normally included in a virus machine is included in a proxy, the computer readable program code means in said article of manufacture comprising:
   a proxy which includes debug information normally found in a virtual machine;
   computer readable code means for causing a computer to effect receiving request packets sent by a debugger prior to receipt of the request packets by the virtual machine;
   computer readable code means for causing a computer to effect processing the request packets so that required debug information is provided to predetermined packets of the request packets from said proxy;
   computer readable code means for causing a computer to effect transmitting the processed predetermined request packets as reply packets to the debugger;
   computer readable code means for causing a computer to effect transmitting non-predetermined request packets to the virtual machine;
   computer readable code means for causing a computer to effect receiving reply packets from the virtual machine;
   computer readable code means for causing a computer to effect processing the received reply packets for reply to the debugger; and
   computer readable code means for causing a computer to effect transmitting the processed received reply packets to the debugger.

16. The article of manufacture according to claim 15 wherein the virtual machine is a target Java virtual machine.

17. The article of manufacture according to claim 15 wherein the debug information is transferred from the virtual machine to said proxy prior to initiation of debugging the virtual machine.

18. The article of manufacture according to claim 15 wherein the debug information is an image of the virtual machine.

19. The article of manufacture according to claim 15 wherein the debug information comprises line tables and the step of processing request packets comprises translating line-based request packets to instruction-based request packets.

20. The article of manufacture according to claim 15 wherein the format of the request packets is defined by the Java Debug Wire Protocol (JDWP).

21. The article of manufacture according to claim 15 wherein the predetermined packets are those packets determined to require debug information.

22. A computer program product for use in debugging a Java virtual machine such that debug information required by a debugger normally included in the Java virtual machine is included in a proxy, the computer program product comprising:

a proxy which includes debug information;

means for receiving request packets from a debugger prior to receipt of the request packets by the Java virtual machine;

means for processing the request packets so that required debug information is provided to predetermined packets of the request packets from said proxy;

means for determining whether the request packets are required to be transmitted to the Java virtual machine and if not so required, transmitting first reply packets to the debugger;

means for transmitting, if so required, the processed request packets to the Java virtual machine;

means for receiving second reply packets from the Java virtual machine;

means for processing the second reply packets for reply to the debugger; and means for transmitting the processed second reply packets to the debugger.

23. A computer program product for use in debugging a Java virtual machine such that debug information required by a debugger normally included in the Java virtual machine is included in a proxy, the computer program product comprising:

a proxy which includes debug information;

means for receiving request packets from a debugger prior to receipt of the request packets by the Java virtual machine;

means for processing the request packets so that required debug information is provided to predetermined packets of the request packets by said proxy;

means for transmitting the processed predetermined request packets as reply packets to the debugger;

means for transmitting non-predetermined request packets to the Java virtual machine;

means for receiving reply packets from the Java virtual machine;

means for determining whether additional information is needed by the Java virtual machine and if so needed, transmitting one or more additional request packets to the Java virtual machine and receiving one or more additional reply packets from the Java virtual machine until the additional information is obtained;

means for processing the received reply packets and additional reply packets, if any, for reply to the debugger; and means for transmitting the processed received reply packets to the debugger.

* * * * *